US012679498B2

(12) United States Patent
Chen et al.

(10) Patent No.: US 12,679,498 B2
(45) Date of Patent: Jul. 14, 2026

(54) DUAL-CONTROL SYSTEM FOR ELECTRIC BICYCLE AND SWITCHING METHOD FOR VELOCITY AND TORQUE DRIVE FOR ELECTRIC BICYCLE

(71) Applicant: ZHEJIANG FEISHEN VEHICLE INDUSTRY CO., LTD, Jinhua (CN)

(72) Inventors: Xiangyang Chen, Jinhua (CN); Yi Huang, Jinhua (CN)

(73) Assignee: ZHEJIANG FEISHEN VEHICLE INDUSTRY CO., LTD, Jinhua (CN)

( * ) Notice: Subject to any disclaimer, the term of this patent is extended or adjusted under 35 U.S.C. 154(b) by 17 days.

(21) Appl. No.: 18/787,892

(22) Filed: Jul. 29, 2024

(65) Prior Publication Data

US 2025/0376242 A1     Dec. 11, 2025

Related U.S. Application Data

(63) Continuation of application No. PCT/CN2024/103222, filed on Jul. 3, 2024.

(30) Foreign Application Priority Data

Jun. 11, 2024     (CN) .......................... 202410743030.5

(51) Int. Cl.
  *B62M 6/50*        (2010.01)
  *B62J 45/411*      (2020.01)
  *B62M 6/45*        (2010.01)
(52) U.S. Cl.
  CPC .............. *B62M 6/50* (2013.01); *B62J 45/411* (2020.02); *B62M 6/45* (2013.01)
(58) Field of Classification Search
  CPC ........... B62M 6/50; B62M 6/45; B62J 45/411

USPC ........................................................ 701/22
See application file for complete search history.

(56)                References Cited

U.S. PATENT DOCUMENTS

| | | | | | |
|---|---|---|---|---|---|
| 4,785,674 | A | * | 11/1988 | Orman .................... | G01L 3/108 |
| | | | | | 482/901 |
| 9,840,305 | B1 | * | 12/2017 | Tsuchizawa ............. | B62M 6/80 |
| 9,845,133 | B2 | * | 12/2017 | Craven ................... | B60L 53/00 |
| 2004/0220712 | A1 | * | 11/2004 | Takeda ..................... | B62J 45/20 |
| | | | | | 701/32.5 |
| 2009/0184599 | A1 | * | 7/2009 | Kanazawa ............... | H02K 9/06 |
| | | | | | 310/195 |
| 2014/0042943 | A1 | * | 2/2014 | Qin ......................... | H02P 21/50 |
| | | | | | 318/400.34 |
| 2019/0389535 | A1 | * | 12/2019 | Moening .................. | B62M 6/90 |

* cited by examiner

FOREIGN PATENT DOCUMENTS

JP            5242646   B2   *   7/2013

*Primary Examiner* — Jelani A Smith
*Assistant Examiner* — Dana D Ivey

(57)                ABSTRACT

A dual-control system for an electric bicycle and a switching method for velocity and torque drive for an electric bicycle are disclosed. A dual-driven algorithm controller provided by the present application receives instructions from an instrument communication signal module, interacts with a bilateral single-direction signal magnetic detection torque sensor to obtain velocity signals or torque signals, and then outputs a corresponding velocity or torque through a field oriented control (FOC) motor control module; and the bilateral single-direction signal magnetic detection torque sensor is configured to convert the twist deformation of a bottom bracket in a pedal of an electric bicycle into electrical signals.

5 Claims, 2 Drawing Sheets

DUAL-CONTROL SYSTEM FOR ELECTRIC BICYCLE AND SWITCHING METHOD FOR VELOCITY AND TORQUE DRIVE FOR ELECTRIC BICYCLE

CROSS-REFERENCE TO RELATED APPLICATIONS

This application is a continuation of PCT/CN2024/103222, filed Jul. 3, 2024 and claims priority of Chinese Patent Application No. 202410743030.5, filed on Jun. 11, 2024, the entire contents of which are incorporated herein by reference.

TECHNICAL FIELD

The present application relates to the technical field of electric bicycle control, and in particular, to a dual-control system for an electric bicycle and a switching method for velocity and torque drive for an electric bicycle.

BACKGROUND

At present, the electric bicycle market appears diversified development, mainly divided into two categories: velocity type and torque type according to the types of sensors carried by the electric bicycle.

The velocity-type electric bicycle relies on a speed sensor, which generates pulse signals by monitoring the frequency of pedal rotation, one sensor is usually arranged with 6 or 12 inductive magnet steels, and every circle treading only generates 6 to 12 signals, resulting in a relatively slow response, the riding experience is limited under complex road conditions or load-bearing conditions, and it is more suitable for a flat and burden-free riding environment. Based on the battery power supply, regulated by the battery management system (BMS), the power system of such vehicles converts velocity signals into motor power, to realize the cooperative work of manpower and electric drive. The velocity-type electric bicycle is not conducive to sporty riding, for example, when climbing or on some complex road conditions, the higher rotational speed and insufficient torque can cause abnormal noise and overheating of the motor, which affects the riding experience.

By contrast, the torque-type electric bicycle is arranged with a torque sensor, which can capture subtle changes in the pedal forces of a rider; and it not only outputs frequency pulse signals, but also generates linear voltage signals that reflect the magnitude of the pedalling force. This design enables the vehicle to perform excellently when climbing, carrying heavy loads, or off-road riding. However, its instantaneous acceleration performance is relatively weak, on ordinary smooth roads, both accelerating and high-speed cruising are not smooth enough, which is not as good as the velocity-type electric bicycle.

In view of the respective advantages and limitations of the above two types of electric bicycles, a more comprehensive power solution is urgently needed in the market, to adapt to a wider range of riding needs and preferences.

Based on this, the present application proposes an innovative dual-control system for electric bicycles, which combines two modes of velocity driving and torque driving; its purpose is to achieve the best power distribution in different cycling scenarios selectively for users through intelligent control logic and algorithm optimization; and whether it is easy cruising on a smooth road, or facing rugged terrain and load challenges, it can provide ideal riding assistance, which greatly enriches the users' cycling experience and freedom of choice.

SUMMARY

The technical solution adopted by the present application to solve technical problems is a dual-control system for an electric bicycle, including a dual-driven algorithm controller and a bilateral single-direction signal magnetic detection torque sensor.

The dual-driven algorithm controller includes a communication module, a velocity signal acquisition module, a torque signal acquisition module and a field oriented control (FOC) motor control module;

the bilateral single-direction signal magnetic detection torque sensor includes a bilateral torque sensor module and a single-direction cadence signal module;

the dual-driven algorithm controller is configured to receive instructions from an instrument communication signal module, interact with the bilateral single-direction signal magnetic detection torque sensor to obtain velocity signals or torque signals, and then output a corresponding velocity or torque through the FOC motor control module; and the bilateral single-direction signal magnetic detection torque sensor is configured to convert the twist deformation of a bottom bracket in a pedal of an electric bicycle into electrical signals.

In some embodiments, the bilateral single-direction signal magnetic detection torque sensor outputs different pulse signals according to a frequency difference when a pedal rotates forward, while it does not output pulse signals when the pedal is reversed, which is configured to improve the accuracy of the riding direction determination.

In some embodiments, the dual-driven algorithm controller is configured to receive cadence signals from the bilateral single-direction signal magnetic detection torque sensor in a speed assist mode through the velocity signal acquisition module, and adjust a drive velocity of a motor accordingly, to achieve the speed assist mode.

In some embodiments, the dual-driven algorithm controller is configured to receive trampling pressure signals from the bilateral single-direction signal magnetic detection torque sensor through the torque signal acquisition module in a torque assist mode and adjust an output torque of a motor accordingly, to adapt to different riding strength requirements.

In some embodiments, the bilateral single-direction signal magnetic detection torque sensor is configured with 36 magnetic poles.

On the other hand, the present application provides a switching method for velocity and torque drive for an electric bicycle, including the following configurations and methods:

a) sending instructions to a dual-driven algorithm controller through an instrument communication signal module, and selecting a speed assist mode or a torque assist mode;

b) obtaining, in the speed assist mode, cadence signals of an electric bicycle by a bilateral single-direction signal magnetic detection torque sensor, determining a trampling direction and a trampling frequency of a rider through the cadence signals by the dual-driven algorithm controller, and finally, driving a motor to output a corresponding velocity through an FOC motor control module; and c) obtaining, in the torque assist mode, trampling pressure signals of the electric bicycle by the bilateral single-direction signal magnetic detection torque sensor, determining a trampling force of the rider through the trampling pressure signals by the dual-driven algorithm controller, and finally driving the motor to output a corresponding torque through the FOC motor control module.

In some embodiments, the instrument communication signal module can selectively provide several velocity or torque selection signals for different gears.

The beneficial effects of the present application are:

1. Enhancement of riding experience and adaptability: the dual-control system integrates two modes of speed assist drive and torque assist drive and can be switched intelligently according to the rider's needs and actual road conditions, which not only ensures easy riding on a gentle road surface, but also ensures the efficient power output in the case of climbing or load-bearing, greatly enriching the riding experience and improving the environmental adaptability of the vehicle.

2. Accurate control and response: adopting the bilateral single-direction signal magnetic detection torque sensor achieves accurate perception of pedalling action, including subtle changes in direction, frequency, and pedal forces, so as to ensure that the motor output power and the rider's intention is highly synchronized, which improves the smoothness and control accuracy of the ride. Meanwhile, the bilateral single-direction signal magnetic detection torque sensor in the present embodiment is configured with 36 magnetic poles, which is better than the sensors in the prior art in the collection quantity, and the collected data is larger, providing effective support for the implementation of the assist system.

3. Improvement of system reliability and durability: through the innovative design of the torque sensor, especially its characteristics of not outputting pulse signals when the pedal is reversed, the accuracy of the determination of the riding direction is enhanced, and the possibility of misoperation is reduced, at the same time, this design also indirectly improves the durability of the sensor and prolongs the service life.

4. Intelligent driving algorithm: the dual-driven algorithm controller integrates the communication module, the speed and torque signal acquisition modules, and the FOC motor control module, to form an efficient closed-loop control system. It can not only respond quickly to the riding instructions, but also dynamically adjust the output of the motor. Whether it is speed matching or torque adaptation, it can ensure that the power output during the riding process is timely and moderate.

5. Flexible riding mode selection: through the instrument communication signal module, riders can choose the appropriate assist or torque assist mode according to their personal preferences or riding conditions, and even refine the selection to different gears, further customizing the riding experience and increasing the convenience and satisfaction of use.

BRIEF DESCRIPTION OF THE DRAWINGS

The following is a further explanation of the present application in combination with the accompanying drawings and embodiments.

DETAILED DESCRIPTION OF THE EMBODIMENTS

Figures 1, 2:
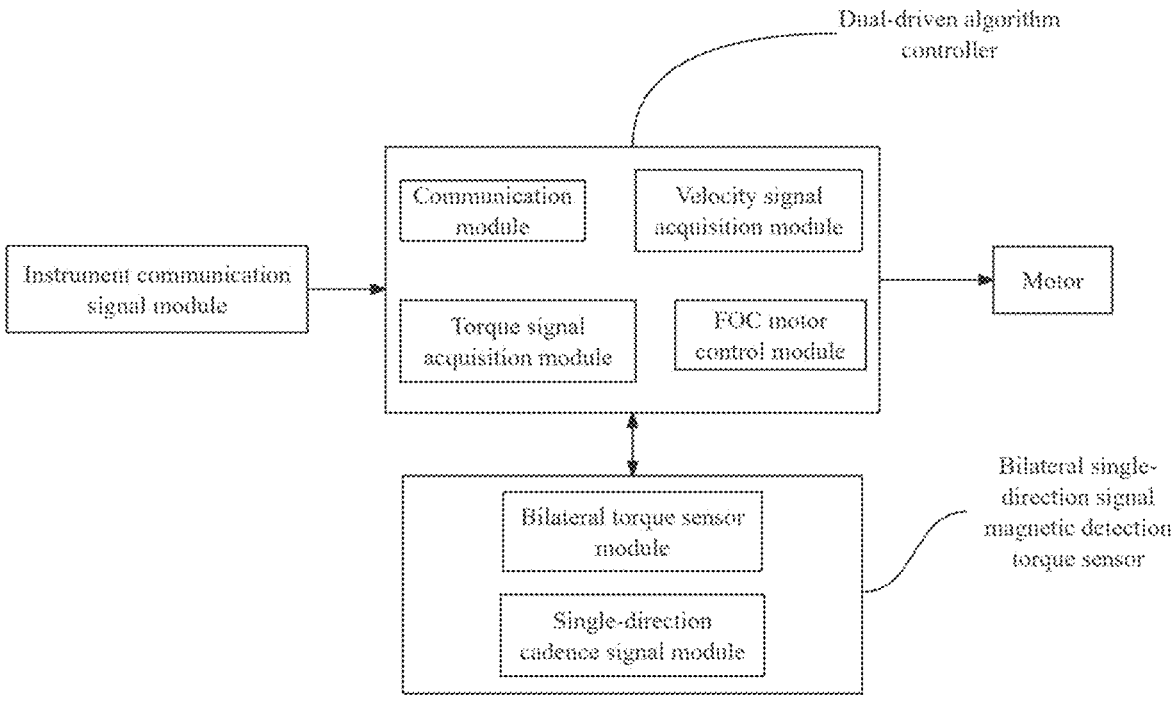
FIG. 1 is a structure diagram of the present application.
FIG. 2 is a signal output diagram when a pedal rotates forward in an assist mode of the present application.

In the following, the technical solutions in the embodiments of the present application will be clearly and completely described with reference to the accompanying drawings in the embodiments of the present application. Apparently, the described embodiments are only a part of the embodiments of the present application, but not all the embodiments thereof. Based on the embodiments of the present application, all other embodiments obtained by those of ordinary skill in the art without any creative efforts shall fall within the scope of the present application. In addition, the technical solutions between various embodiments can be combined with each other, but they must be based on the realization of those of ordinary skill in the art. When the combination of technical solutions is contradictory or impossible to achieve, it is to be considered that this combination of technical solutions does not exist and is not within the scope of protection of the present application.

Referring to FIGS. 1-5, an embodiment of the present application is a dual-control system for electric bicycles, in terms of hardware construction, including a dual-driven algorithm controller and a bilateral single-direction signal magnetic detection torque sensor.

As a core control unit, the dual-driven algorithm controller integrates a communication module, a velocity signal acquisition module, a torque signal acquisition module and an FOC motor control module. The communication module is configured to receive control instructions sent by an instrument; the velocity and torque signal acquisition modules are configured to acquire signals from the bilateral single-direction signal magnetic detection torque sensor, respectively; and the FOC motor control module is configured to adjust the motor output based on these signals, to achieve accurate torque or velocity control.

The bilateral single-direction signal magnetic detection torque sensor includes a bilateral torque sensor module and a single-direction cadence signal module; the bilateral single-direction signal magnetic detection torque sensor is configured to convert the twist deformation of a bottom bracket in a pedal of an electric bicycle into electrical signals. Then on this basis, it can detect the twist deformation of the bottom bracket without contact and convert the twist deformation into stable electrical signals. When the pedal rotates forward, corresponding pulse signals are output according to the pedalling frequency of different frequencies; and when the pedal is reversed, the signal output can automatically stop to avoid misjudgment.

The "bottom bracket" here refers to a component that is mounted at the bottom of a bicycle frame, connecting the left and right cranks. The cranks are connected to the pedal, when pedalling, the force is transmitted to the bottom bracket through the cranks, and then to a chain and a rear wheel through the bottom bracket, thus driving the bicycle forward. Therefore, the twist deformation of a "bottom bracket" in the present application actually means that when the pedal is applied to an exerted force, the bottom bracket can bear and transmit this torque force (torque); while the sensor mentioned in the present application is configured to detect the torque change or deformation of the bottom bracket in this process and convert these physical changes into electrical signals by wireless mode, to facilitate the control system to adjust the assist output of the motor in real-time.

Figure 3:
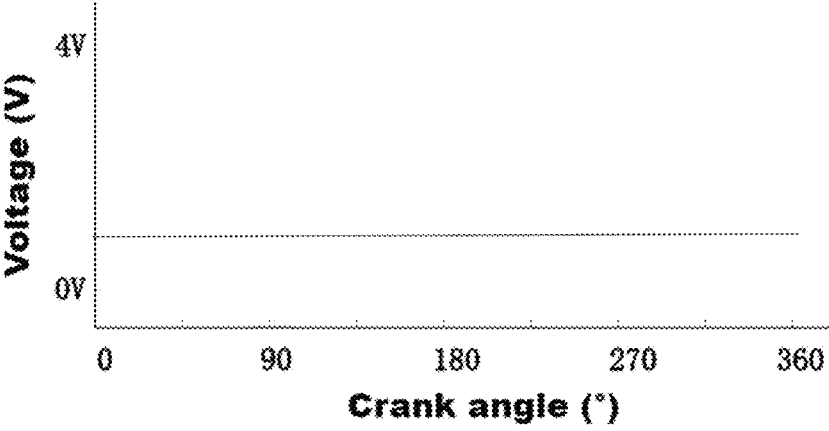
FIG. 3 is a signal output diagram when a pedal is reversed in an assist mode of the present application.
Figure 4:
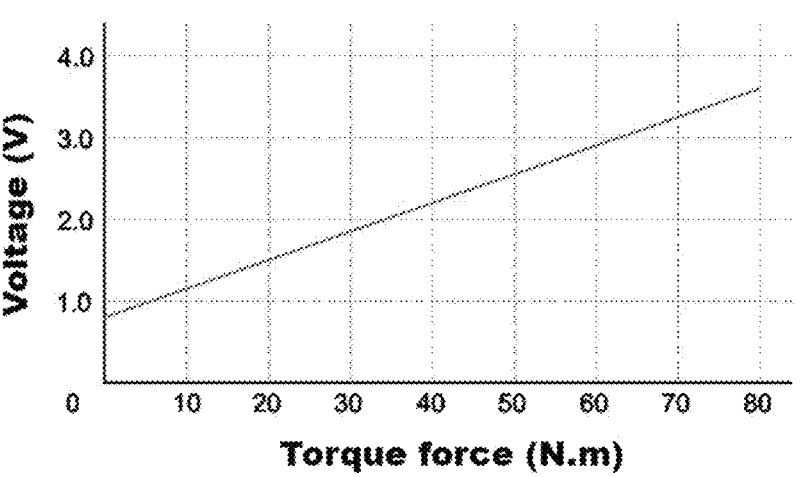
FIG. 4 is a schematic diagram of trampling pressure signals in a torque mode of the present application.

In some embodiments, the specific reference is shown in FIGS. 2-3. For example, as shown in FIG. 2, the bilateral single-direction signal magnetic detection torque sensor outputs different pulse signals according to a frequency difference when the pedal rotates forward. Then referring to FIG. 3, no pulse signal is output when the pedal is reversed. It is used to improve the accuracy of riding direction judgment and reduce the possibility of misjudgment.

In a specific implementation, the dual-driven algorithm controller is configured to receive cadence signals from the bilateral single-direction signal magnetic detection torque sensor by the velocity signal acquisition module in a speed assist mode and adjust a drive speed of a motor according to the cadence signals, to achieve the speed assist mode.

In a specific implementation, the dual-driven algorithm controller is configured to receive trampling pressure signals from the bilateral single-direction signal magnetic detection torque sensor by the torque signal acquisition module in a torque assist mode and adjust an output torque of the motor according to the cadence signals, to adapt to the needs of different riding strength.

In the present embodiment, the bilateral single-direction signal magnetic detection torque sensor is configured with 36 magnetic poles, which is better than the sensors in the prior art in the collection quantity, and the collected data is larger, providing effective support for the implementation of the assist system.

On the other hand, the present application provides a switching method of velocity and torque drive for an electric bicycle, including the following configurations and methods:

a) instructions are sent to a dual-driven algorithm controller through an instrument communication signal module, and a speed assist mode or a torque assist mode is selected;

b) in the speed assist mode, cadence signals of the electric bicycle are obtained by a bilateral single-direction signal magnetic detection torque sensor, a trampling direction and a trampling frequency of a rider are determined by the dual-driven algorithm controller through the cadence signals, and finally, a motor is driven to output a corresponding velocity through an FOC motor control module; and c) in the torque assist mode, trampling pressure signals of the electric bicycle are obtained by the bilateral single-direction signal magnetic detection torque sensor, a trampling force of the rider is determined by the dual-driven algorithm controller through the trampling pressure signals, and finally the motor is driven to output a corresponding torque through the FOC motor control module.

Its operation process can also be summarized as follows:

Speed Assist Mode:

The rider selects the assist mode through the instrument communication signal module.

The bilateral single-direction signal magnetic detection torque sensor captures forward rotation cadence signals of the pedal, and the signals contain direction and frequency information.

After receiving signals, the dual-driven algorithm controller analyzes the cadence through the velocity signal acquisition module and immediately instructs the FOC motor control module to adjust the rotating velocity of the motor, to match the rhythm and strength of the rider's pedalling.

Torque Assist Mode:

When the rider chooses the torque assist mode, the instrument also sends instructions to the controller through the communication module.

At this time, the torque sensor focuses on monitoring the trampling pressure and converts the pressure change into electrical signals.

The torque signal acquisition module receives and processes these signals, and the dual-driven algorithm controller adjusts the FOC motor control strategy accordingly and outputs the motor torque matching the rider's pedal strength, which is especially suitable for climbing or load riding.

Figure 5:
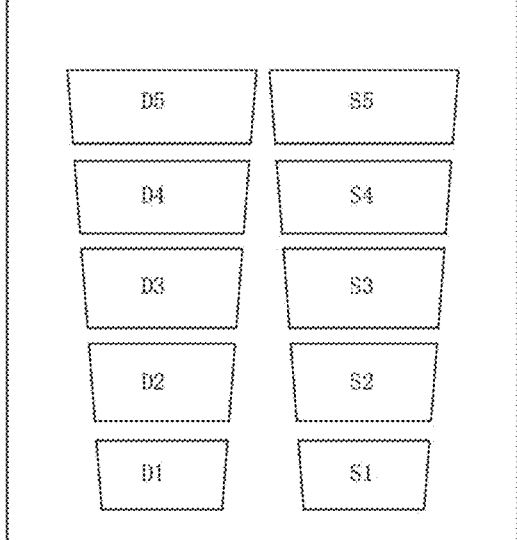
FIG. 5 is an embodiment of the dashboard of the present application.

The instrument communication signal can selectively provide several assist or torque selection signals of different gears, in addition to the basic mode selection, the instrument communication module can also send several gear instructions, allowing the riders to fine-tune the assist or torque output intensity according to personal preferences or riding conditions, further improving the flexibility and personalized experience of riding. For example, as shown in FIG. 5, the dashboard is arranged with five D1-D5 torque gears and five S1-S5 speed gears, and the rider can select different gears or combinations operationally.

So far, various embodiments of the present application have been described in detail. In order to avoid obscuring the concept of the present application, some details well-known in this field are not described. Those skilled in the art can fully understand how to implement the technical solutions disclosed herein based on the above description.

Finally, it is to be noted that the above are only preferred embodiments of the present application, and the foregoing embodiments are used only to illustrate the technical solutions of the present application and not to restrict it; although the present application has been described in detail with reference to the aforementioned embodiments, those skilled in the art should understand that the technical solutions described in the aforementioned embodiments can still be modified, or some of the technical features can be equivalently replaced; and these modifications or replacements do not drive the essence of the corresponding technical solutions to deviate from the spirit and scope of the various embodiments of the technical solutions in the present application.

The invention claimed is:

1. A dual-control system for an electric bicycle, comprising:

a dual-driven algorithm controller and a bilateral single-direction signal magnetic detection torque sensor, wherein the dual-driven algorithm controller comprises a communication module, a velocity signal acquisition module, a torque signal acquisition module and a field oriented control (FOC) motor control module;

the bilateral single-direction signal magnetic detection torque sensor comprises a bilateral torque sensor module and a single-direction cadence signal module;

the dual-driven algorithm controller is configured to receive instructions from an instrument communication signal module, interact with the bilateral single-direction signal magnetic detection torque sensor in a speed assist mode to obtain velocity signals, and then output a velocity corresponding a speed gear through the FOC motor control module, and interact with the bilateral single-direction signal magnetic detection torque sensor in a torque assist mode to obtain torque signals, and then output a torque corresponding a torque gear through the FOC motor control module; and the bilateral single-direction signal magnetic detection torque sensor is configured to convert the twist deformation of a bottom bracket in a pedal of an electric bicycle into electrical signals;

wherein the dual-driven algorithm controller is configured to receive cadence signals from the bilateral single-direction signal magnetic detection torque sensor in a speed assist mode through the velocity signal acquisition module, and adjust a drive velocity of a motor accordingly, to achieve the speed assist mode;

wherein the dual-driven algorithm controller is configured to receive trampling pressure signals from the bilateral single-direction signal magnetic detection torque sensor through the torque signal acquisition module in a torque assist mode and adjust an output torque of a motor accordingly, to adapt to different riding strength requirements;

wherein the cadence signals comprises a trampling direction and a trampling frequency of a rider.

2. The dual-control system for an electric bicycle according to claim 1, wherein the bilateral single-direction signal magnetic detection torque sensor outputs different pulse signals according to a frequency difference when a pedal rotates forward, while it does not output pulse signals when the pedal is reversed, to improve the accuracy of the riding direction determination.

3. The dual-control system for an electric bicycle according to claim 1, wherein the bilateral single-direction signal magnetic detection torque sensor is configured with 36 magnetic poles.

4. A switching method for velocity and torque drive for an electric bicycle, comprising the following configurations and methods:

a) sending instructions to a dual-driven algorithm controller through an instrument communication signal module, and selecting a speed assist mode or a torque assist mode;

b) obtaining, in a speed assist mode, cadence signals of an electric bicycle by a bilateral single-direction signal magnetic detection torque sensor, determining a trampling direction and a trampling frequency of a rider through the cadence signals by the dual-driven algorithm controller, and finally, driving a motor to output a velocity corresponding a speed gear through an FOC motor control module; and c) obtaining, in a torque assist mode, trampling pressure signals of the electric bicycle by the bilateral single-direction signal magnetic detection torque sensor, determining a trampling force of the rider through the trampling pressure signals by the dual-driven algorithm controller, and finally driving the motor to output a torque corresponding a torque gear through the FOC motor control module.

5. The switching method for velocity and torque drive for an electric bicycle according to claim 4, wherein the instrument communication signal module may selectively provide several velocity or torque selection signals for different gears.

* * * * *